US012657016B1

(12) United States Patent (10) Patent No.: US 12,657,016 B1
Jacobs et al. (45) Date of Patent: Jun. 16, 2026

(54) METHOD FOR DYNAMIC BINARY MESSAGE DECODING

(71) Applicant: Amazon Technologies, Inc., Seattle, WA (US)

(72) Inventors: Anthony Samuel Jacobs, Olney, MD (US); John Martin Standish, Tustin, CA (US); Graham Mark Boone, Minneapolis, MN (US); Michael Almeida, Amherst, NH (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 18/343,539

(22) Filed: Jun. 28, 2023

(51) Int. Cl.
G06F 8/51 (2018.01)

(52) U.S. Cl.
CPC ...................................... G06F 8/51 (2013.01)

(58) Field of Classification Search
CPC ......................................................... G06F 8/51
See application file for complete search history.

(56) References Cited

U.S. PATENT DOCUMENTS

| | | | | |
|---|---|---|---|---|
| 7,085,814 B1 * | 8/2006 | Gandhi | .................... | H04L 67/14 |
| | | | | 709/208 |
| 7,441,185 B2 * | 10/2008 | Coulson | ................ | G06F 40/149 |
| | | | | 715/234 |
| 7,590,644 B2 | 9/2009 | Matsakis et al. | | |
| 8,056,000 B2 * | 11/2011 | Vidyarthi | .............. | G06F 16/258 |
| | | | | 715/239 |

| | | | | |
|---|---|---|---|---|
| 8,296,461 B2 * | 10/2012 | Sirdevan | ................ | G06Q 10/06 |
| | | | | 707/999.2 |
| 8,763,009 B2 * | 6/2014 | Degirmenci | ............ | G06F 9/451 |
| | | | | 719/329 |
| 10,031,836 B2 | 7/2018 | Versteeg et al. | | |
| 10,122,788 B2 * | 11/2018 | Ghare | ............... | G06F 16/24568 |
| 10,489,418 B2 * | 11/2019 | Greenblatt | ............ | G06F 40/221 |
| 10,534,843 B2 * | 1/2020 | Smith | ...................... | G06F 21/62 |
| 10,558,717 B2 * | 2/2020 | Monjas Llorente | .. | H04L 47/805 |
| 11,176,104 B2 * | 11/2021 | Chauhan | ............. | G06F 11/0769 |
| 12,101,388 B2 * | 9/2024 | Tegel | ...................... | G06F 16/84 |

(Continued)

FOREIGN PATENT DOCUMENTS

WO     WO-2023250472 A1 * 12/2023

OTHER PUBLICATIONS

WO-2023250472-A1 English Text.*

*Primary Examiner* — Francisco J Aponte

(74) *Attorney, Agent, or Firm* — S. Scott Foster; Kowert, Hood, Munyon, Rankin & Goetzel, P.C.

(57) ABSTRACT

Dynamic translation of data records is performed. A client of a translation service may request translation of binary data according to a binary data protocol to be output according to an output schema different from the binary data protocol. A dynamic translation engine may be configured to connect to an input data stream implementing the binary data protocol and connect to an output data consumer or storage device. The dynamic translation engine may then identify records on the source data stream according to the binary protocol, extract keys and values for individual fields of records, then output key-value pairs or alternative binary encodings to output records formatted according to the output schema. The binary data protocol and output schema may be dynamically defined and optionally updated during translation.

20 Claims, 8 Drawing Sheets

(56) References Cited

U.S. PATENT DOCUMENTS

| | | | | |
|---|---|---|---|---|
| 2009/0327398 | A1* | 12/2009 | Campbell | H04W 8/245 |
| | | | | 709/202 |
| 2013/0311444 | A1* | 11/2013 | Samwel | G06F 16/245 |
| | | | | 707/714 |
| 2017/0223075 | A1* | 8/2017 | Hong | G06F 8/65 |
| 2019/0303382 | A1* | 10/2019 | Bostic | G06F 16/951 |
| 2021/0303588 | A1* | 9/2021 | Thomas | G06F 9/3001 |
| 2023/0050199 | A1* | 2/2023 | Cook | G06F 16/221 |
| 2023/0418955 | A1* | 12/2023 | Jacobs | G06F 21/14 |
| 2024/0232539 | A1* | 7/2024 | Venkateshwaran | G06N 3/044 |

* cited by examiner

| | | |
|---|---|---|
| 400 | 8 bit unsigned integer | record version |
| 410 | 8 bit enumerated value | message type |
| 420 | 16 bit unsigned integer | sequence number |
| 430 | 16 bit unsigned integer | payload length |
| 440 | 32 bit unsigned integer | timestamp |
| 450 | 8 bit unsigned integer | payload descriptor |
| 460 | 8 bit enumerated value | flags |

*FIG. 4*

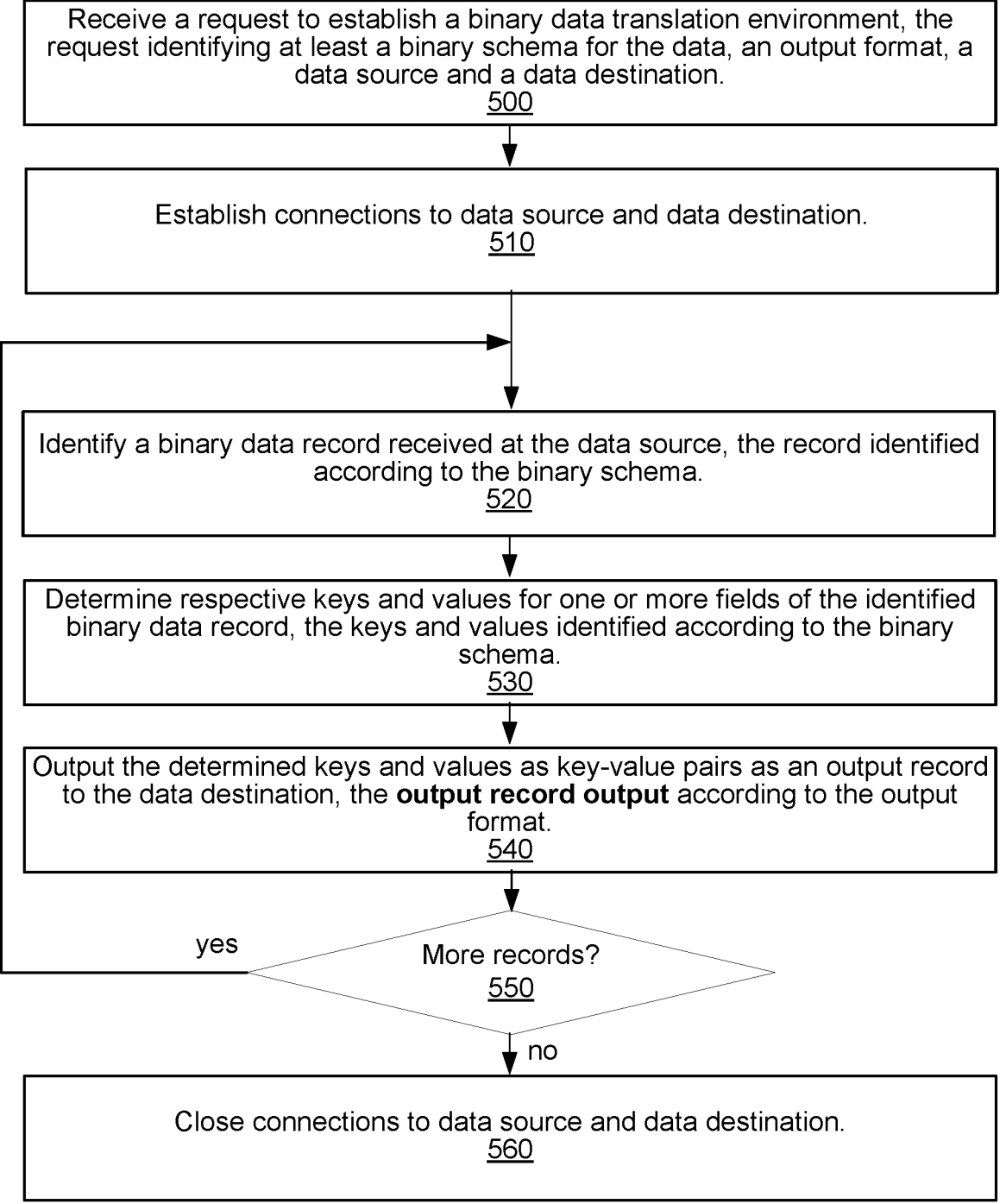

Receive a request to establish a binary data translation environment, the request identifying at least a binary schema for the data, an output format, a data source and a data destination.
500

Establish connections to data source and data destination.
510

Identify a binary data record received at the data source, the record identified according to the binary schema.
520

Determine respective keys and values for one or more fields of the identified binary data record, the keys and values identified according to the binary schema.
530

Output the determined keys and values as key-value pairs as an output record to the data destination, the output record output according to the output format.
540

More records?
550 yes no

Close connections to data source and data destination.
560

FIG. 5

Define a binary data schema and an output schema for a data translation.
600

Initiate data translation according to the binary data schema and output schema.
610

Update the binary data schema and/or the output schema while translation is in progress.
620

METHOD FOR DYNAMIC BINARY MESSAGE DECODING

BACKGROUND

Processing and analysis of data streams often benefits from stream formatting that implements standardized protocols. For example, machine learning systems benefit from input data previously created with identifying metadata. However, legacy systems frequently implement messaging solutions in proprietary formats without identifying metadata and often encoded into a binary format. As a result, obtaining data streams from such applications is of limited use without requisite translators to convert the proprietary formats into standardized representations that analysis tools can understand. These translators, however, are error-prone and time-consuming to implement.

BRIEF DESCRIPTION OF DRAWINGS

FIG. 4 is a table illustrating an example binary input data record for a system that implements dynamic binary message decoding, according to at least some embodiments.

FIG. 5 is a flow diagram illustrating aspects of performing dynamic binary message decoding, according to at least some embodiments.

Figure 1:
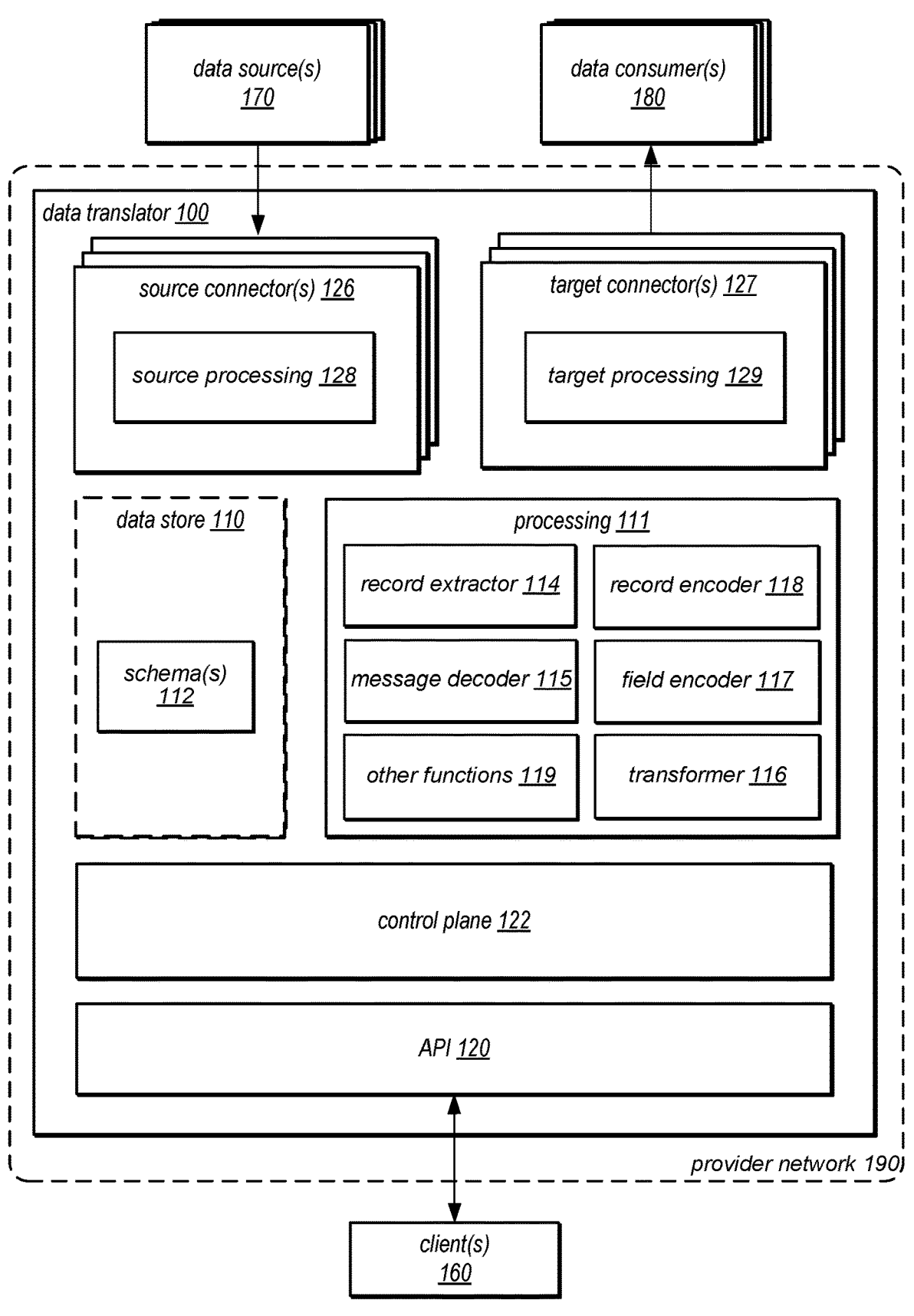
FIG. 1 is a block diagram of an architecture for a system that implements dynamic binary message decoding, according to at least some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Processing and analysis of data streams often benefits from the use of standardized input formats. For example, machine learning systems benefit from input data previously created with identifying metadata and thus are best used with pre-labeled data. Legacy systems, however, often implement various messaging solutions in proprietary formats without identifying metadata and are often encoded in binary formats. As a result, data streams from such applications are of limited use without requisite translators to generate standardized representations that analysis tools can understand. The translators, however, are time consuming and error prone to implement.

Systems and methods for performing dynamic translation of data records are disclosed herein. A client of a translation service may request translation of binary data according to a binary data protocol to be output according to an output schema different from the binary data protocol. A dynamic translation engine may be configured to connect to an input data stream implementing the binary data protocol and connect to an output data consumer or storage device. The dynamic translation engine may then identify records on the source data stream according to the binary protocol, extract keys and values for individual fields of records, then output key-value pairs to output records formatted according to the output schema. The binary data protocol and output schema may be dynamically defined and optionally updated during translation.

FIG. 1 is a block diagram of an architecture for a system that implements dynamic binary message decoding, according to at least some embodiments.

A provider network 100, such as shown in further detail below in FIG. 7, may provide a data translator 100, decoder, binary data translator, translation engine or translation service. In some embodiments, this translator may be configurable to operate on both input data streams and data files, thus the translator may be functional to translate data records that are input sequentially.

A client 160 may access this translation service by providing a data source 170, a destination data consumer 180 and schema definitions 112, the schema definitions include formats for input data records or protocols as well as output schemas that differ from the input format. In some embodiments, data fields of the input records may be encoded in a binary format, while in other embodiments other encodings, such as textual encodings, may be used. Furthermore, different fields may implement different encodings in various embodiments. These are merely examples of encodings and any variety of input encodings may be envisioned.

The client 160 may request data translations via various kinds of programmatic interfaces or application programming interfaces (APIs) 120. In various embodiments, a network-based service may be requested or invoked through the use of a message that includes parameters and/or data associated with the network-based services request. Such a message may be formatted according to a particular markup language, such as JavaScript Object Notation (JSON), Yet Another Markup Language (YAML), Standard Generalized Markup Language (SGML) or Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP). In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message. These are merely examples, however, and are not intended to be limiting. Programmatic interfaces such as the API 120 may be implemented using any number of techniques including proprietary interfaces, in various embodiments.

Data translator 100 may implement control plane 122. Control plane 122 may implement various features for managing the resources and operations for creating and performing data translations. For example, control plane 122 may implement various access control mechanisms or authentication techniques to ensure that requests to perform translations are made with appropriate authorization. Control plane 122 may implement various health or other system monitoring features to ensure that various features or components are functioning correctly, repaired, or replaced.

Data translator 100 may implement data source connectors 126, in various embodiments. Data source connectors 126 may communicate with and obtain input data records from data source(s) 170. In some embodiments, a data source connector 126 may facilitate data input from a variety of sources including data streams or logged data files. These sources may, in various embodiments, provided in binary formats while in other embodiments they may provide data in human-readable formats such as such as JavaScript Object Notation (JSON) schema records, Yet Another Markup Language (YAML) schema records, Standard Generalized Markup Language (SGML) schema records, Extensible Markup Language (XML) schema records, Comma Separated Variable (CSV) entries or other human-readable formats. In some embodiments, the data translator 100 may be implemented as part of a provider network 190 as discussed in further detail in FIG. 7 below. Data source(s) 170 can be various services (or resources hosted within services) of provider network 190 or external to the provider network 190 such as, for example, edge devices or transportable devices useful for importing and exporting data, in various embodiments. In addition, in some embodiments the source connectors 126 may include source processing functions 128 such as data decryption, data decompression and so forth.

In various embodiments, data translator 100 may implement target connector(s) 127. Target connector(s) 127 may connect to and interact with a target consumer of translated data. Similar to a data source connector 126, a target connector 127 can be respectively implemented for different types of targets (e.g., a target connector for a data warehouse, relational database or non-relational database). As discussed above data consumers 180 can be various services (or resources hosted within services) of provider network 190 or may be external to provider network 190. In some embodiments data source(s) 170 and/or data consumers 180 can be implemented partially or completely external to provider network 190 (e.g., at an on-premise network or at another provider service network) . . . . In addition, in some embodiments the target connectors 127 may include target processing functions 129 such as data encryption, data compression and so forth.

In some embodiments, data translator 100 may allow for custom or user-implemented target or source connectors to be provided (e.g., uploaded via an interface and deployed for a requested materialized view) to customize the change data capture or materialized view export (e.g., from on-premise or custom data sources or targets).

Data translator 100 may utilize schema(s) 112 to perform data translations. These schemas may be defined by a particular data translation request, defined in a separate schema definition request, pre-defined by the data translator, and so forth. These examples are not intended to be limiting and any method of defining schemas may be envisioned. Furthermore, a particular data translation request may identify particular schemas to use, then these schemas may be subsequently dynamically updated during translation operation.

A data translation operation may include an input schema or protocol definition as well as an output schema. These input and output schemas are, in some embodiments, different as a result of a need to perform data translation. The data translator 100 may store these various schemas in a various of ways including local persistent or volatile data storage, in some embodiments, or in network accessible remote storage, such as might be provide by a storage service of the provider network 190, in other embodiments. These examples are not intended to be limiting and any number of storage techniques may be envisioned.

The data translator 100 may receive data from a data source 170 for processing by various processing 111 modules. In some embodiments, this data may be encrypted and thus require decryption by source processing 128 or by record extractor 114 before the data is accessed. Decrypted data may be processed by a record extractor 114. Record extraction may occur when data is received according to the input schema. For data streams, bytes may be read from the data source 170 until a sufficient buffer is loaded for subsequent operations. For data packet protocols, zero or more messages may be contained in a packet, and may be buffered where applicable. If a data record includes a compressed payload, then decompression may also be performed by the record extractor 114.

The record extractor 114 may then pass an extracted record to the message decoder 115. Here, the message is decoded according to the input schema. If the schema specifies a validation step (e.g., CRC32, checksum, MAC, error detection code, error correcting code, etc.), then an appropriate validation or verification algorithm is applied. Once validated, the payload is decoded per the fields defined in the schema.

The message decoder 115 may then provide the decoded record to a transformer 116 which may transform the decoded fields according to the input schema. In addition to fields decoded from the data stream, the transformed fields of the data record may include fields that are derived from context and generated during transformation. Examples of such fields include timestamps, data source fields, mathematical operations, unit conversions, coordinate conversions and so forth.

The transformer 116 may then pass the transformed fields of the data record to a field encoder 117 which may iterate through the fields defined in the input schema and produce records with their associated key and type metadata. If fields are specified as input-only, they are omitted from this step. An example would be a checksum field that depends on the details of the binary protocol, and has only transient utility.

Once the fields are encoded, a record encoder 118 may encode the fields and metadata as a new record, such as JavaScript Object Notation (JSON) schema records, Yet Another Markup Language (YAML) schema records, Standard Generalized Markup Language (SGML) schema records, Extensible Markup Language (XML) schema records, Comma Separated Variable (CSV) entries or other convenient formats. If compression is specified in the output, it is applied at this time. The resulting record may be written to the data consumer 180 with potential destination requirements applied, Examples of destination requirements may include encryption, output protocol buffering, network connection handling, port binding, and opening of files. While the above examples include human-readable output records, it should be understood that output formats may include arbitrary output formats including binary formats that are not human-readable. The above output formats are not intended to be limiting and any number of formats can be envisioned.

Finally, the data translator 100 may include other processing functions 119, such as validation, compression, software or hardware optimized for encryption, decoding or other custom processing. These functions may be providing within the data translator 100 or may optionally be implemented external to the translator. For example, a client may specify an input or output schema that requires custom processing that includes other processing functions 119 provided by the client.

Figure 2:
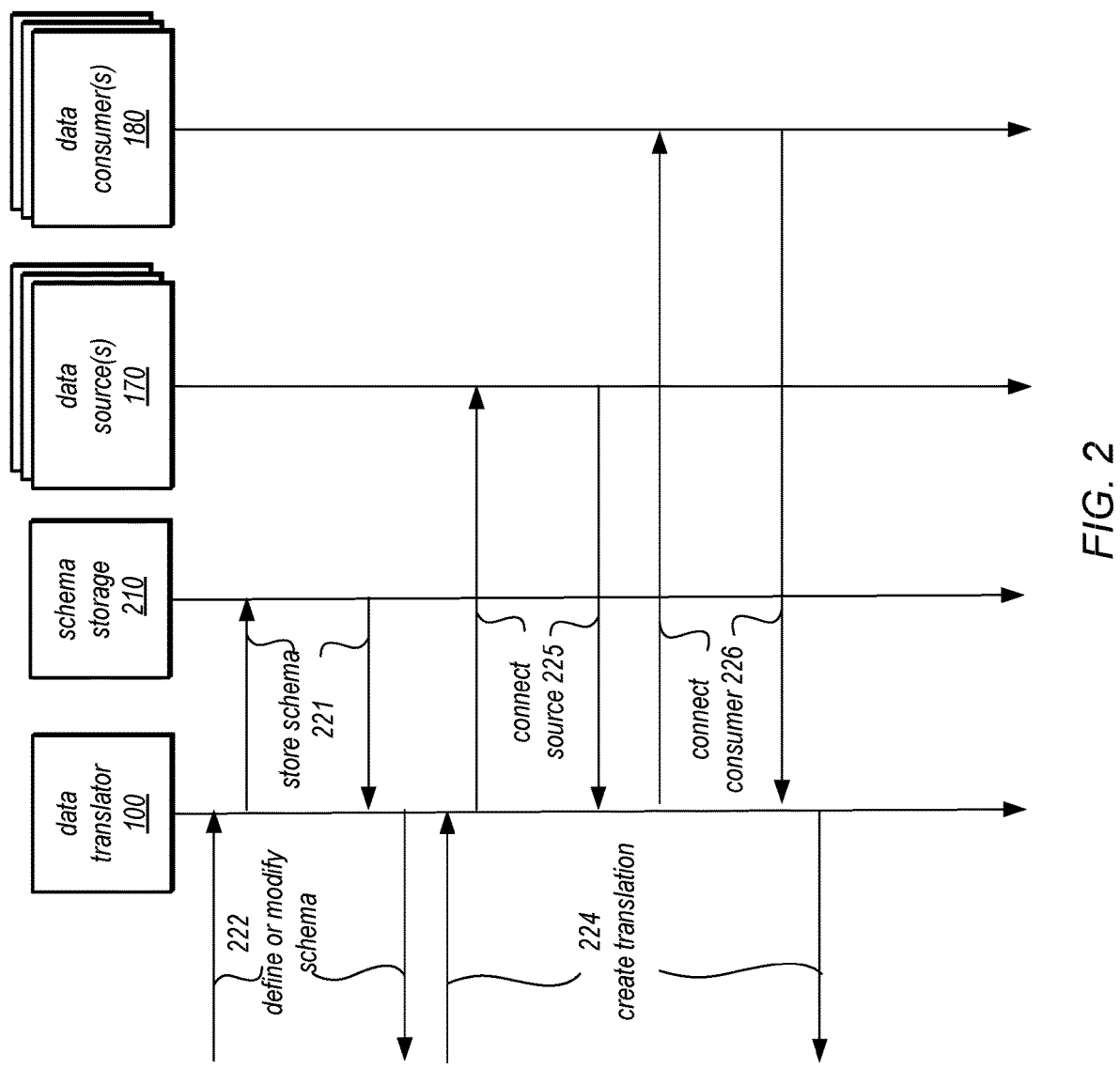
FIG. 2 is a timing diagram illustrating the creating of schema definitions and translation flows for a system that implements dynamic binary message decoding, according to at least some embodiments.

FIG. 2 is a timing diagram illustrating the creating of schema definitions and translation flows for a system that implements dynamic binary message decoding, according to at least some embodiments. A client may submit a request to define or modify one or more schemas 222 to a data translator 100, via a programmatic interface such as the API 120 as shown in FIG. 1. As a result, the data translator 100 may store the schema definitions 221 in schema storage 210. Examples of the schema storage 210 include the data store 110 as shown in FIG. 1 or the database 1910 or storage 1920 services of a service provider network as shown below in FIG. 7. This storage operation may result in the maintenance of a library or catalog of schema definitions accessible to the data translator 100. Alternatively, schema definitions may be created or defined during the creation of a data translation, such as described below. Furthermore, a request to define a schema may include updating or replacing an existing schema. This existing schema may be currently used in active translation operations, allowing the data translator 100 to provide dynamically changing translation services. Furthermore, in some embodiments a schema may be shared between multiple clients of the system, where some schemas may be read-only while others may be editable, as determined by a control plane such as the control plane 122 of FIG. 1.

A client may submit a request to create a data translation 224. Responsive to this request, the data translator 100 may establish a connection 225 to a data source 170 and a connection 226 to a data consumer 180. Additionally, the data translator 100 may perform other initialization operations (not shown) as required, including, for example, establishment of permissions, configuration of decryption functions, selection of schemas and protocols, establishment of authentication credentials, session credentials, and so on.

Figure 3:
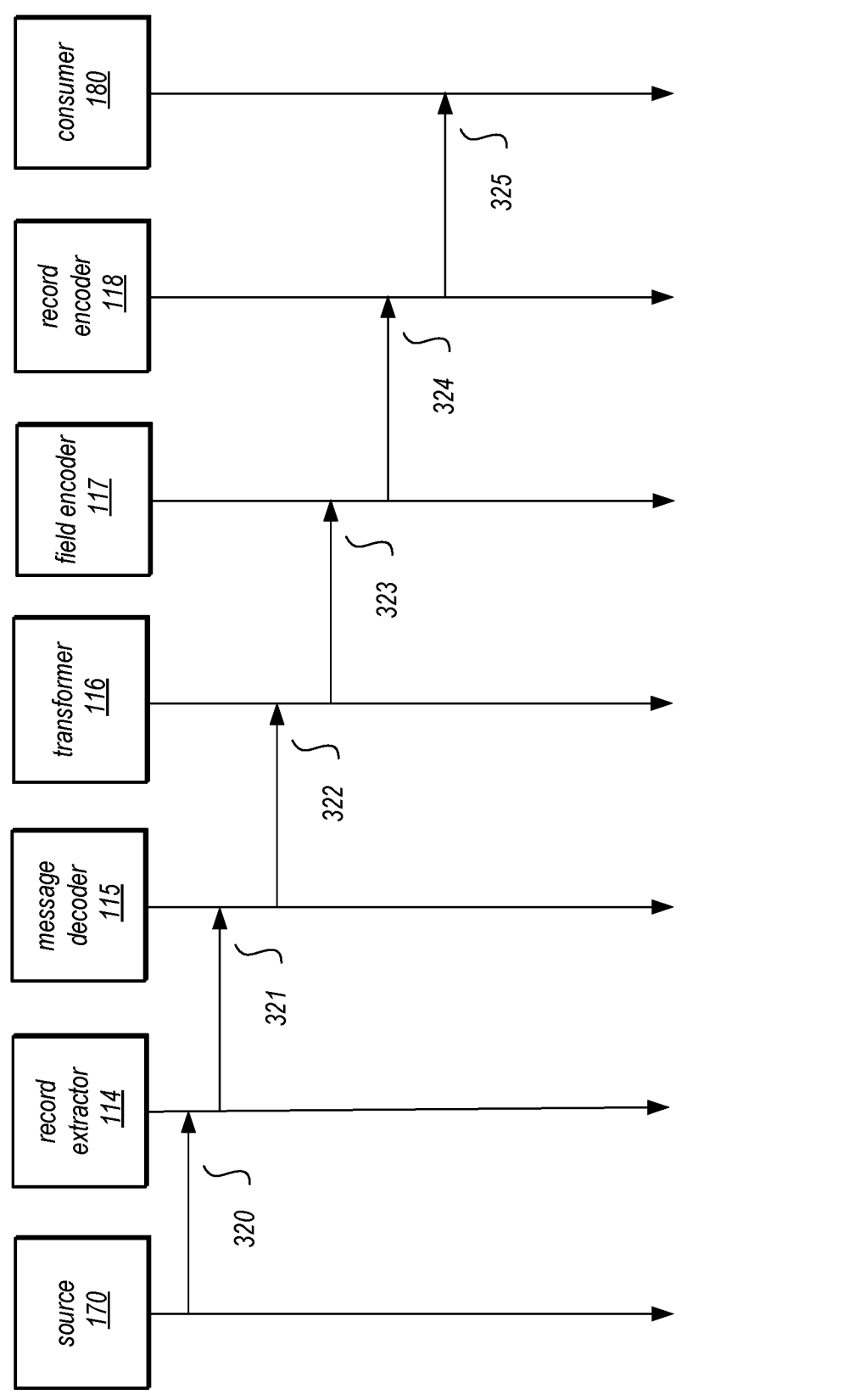
FIG. 3 is a timing diagram illustrating the translation of a data record by a system that implements dynamic binary message decoding, according to at least some embodiments.

FIG. 3 is a timing diagram illustrating the translation of a data record by a system that implements dynamic binary message decoding, according to at least some embodiments. A data translation may be currently established as described in FIG. 2 above. A data source 170 may transmit data 320 including a data record to the record extractor 114. In some embodiments, this data may be encrypted and thus require decryption before the data is accessed. Decrypted data may be processed by a record extractor 114. Record extraction may occur when data is received according to the input schema. If the data source is a data stream, data bytes may be read from the data source 170 until a sufficient buffer is loaded for subsequent operations. For data packet protocols, zero or more messages may be contained in a packet, and may be buffered where applicable. If a data record include a compressed payload, then decompression may also be performed by the record extractor 114.

The record extractor 114 may then transmit 321 an extracted record to the message decoder 115 where the message is decoded according to the input schema associated with the current translation process. If the schema specifies a validation step (e.g., CRC32, checksum, MAC, error detection code, error correcting code, etc.), then an appropriate validation or verification algorithm is applied. Once validated, the payload is decoded per the fields defined in the input protocol.

The message decoder 115 may then provide the decoded record 322 to a transformer 116 which may transform the decoded fields according to the input schema. In addition to fields decoded from the data stream, the transformed fields of the data record may include fields that are derived from context and generated during transformation. Examples of such fields include timestamps, data source fields, mathematical operations, unit conversions, coordinate conversions and so forth.

The transformer 116 may then pass the transformed fields of the data record 323 to a field encoder 117 which may iterate through the fields defined in the input schema and produce records with their associated key and type metadata. If fields are specified as input-only, they are omitted from this step. An example would be a checksum field that depends on the details of the binary protocol, and has only transient utility.

Once the fields are encoded, the data may be transmitted 324 to a record encoder 118 which may encode the fields and metadata as a new record, such as JavaScript Object Notation (JSON) schema records, Yet Another Markup Language (YAML) schema records, Standard Generalized Markup Language (SGML) schema records, Extensible Markup Language (XML) schema records, Comma Separated Variable (CSV) entries or other convenient formats. If compression is specified in the output, it is applied at this time.

The resulting record may be written 325 to the data consumer 310, such as a data consumer 180 as shown in FIG. 1, with potential destination requirements applied, Examples of destination requirements may include encryption, output protocol buffering, network connection handling, port binding, and opening of files.

FIG. 4 is a table illustrating an example binary input data record for a system that implements dynamic binary message decoding, according to an example embodiment. A data translator may receive as input a variety of data streams from any number of sources. In some embodiments, these streams may be composed of a variety of records associated with a stream of events, such as API calls, while in other embodiments records could be associated with data packets of TCP, UDP, Serial, and MQTT communications streams or of data bus protocols such as i2c or CANbus. As such, a data translator may be configured to have flexibility in recognizing and processing binary data records.

Fields of data records could include data values encoded for a variety of formats, for example as integers, floating point values, enumerations, bit fields, and strings. These fields may be implemented as a variety of binary widths and use a number of different binary encodings, for example as ones-complement or twos-complement encodings for integers or as one of a number of standard floating point formats. An input schema may specify a sequence of fields in a data record along with their associated encodings and additional metadata, such as key values. Shown in FIG. 4 is an example binary data record that include a number of integer input fields of various bit widths as well as a binary field that defines a number of flag values. Such an input record might be typical of a packet protocol such as used when transmitted over a network connection. 400 shows an 8 bit unsigned integer version of the record, 410 shows an 8 bit enumerated value message type, 420 shows a 16 bit unsigned integer sequence number that May for example, monotonically increase for successive records or messages, 430 shows a 16 bit unsigned integer shows a payload length, 440 shows a record time stamp as a 32 bit unsigned integer, 450 provides metadata for the payload as an 8 bit unsigned integer and 460 shows an 8 bit enumerated value flags field. The record may then include a payload of length defined in 430. As has been discussed previously, the payload may then be compressed and/or encrypted. It should be understood that these fields are merely examples of fields that may appear in a typical input record and do not have any special significance to the translation process itself. It should also be noted that there may be fields that do not get translated as output fields, for example the sequence number 420 may not be output as a key-value pair. In addition, there may be fields to be output which are generated from record context but do not appear as fields of the input record. An example of such a field may be a data source identifier.

FIG. 5 is a flow diagram illustrating aspects of performing dynamic binary message decoding, according to at least some embodiments. As shown in 500, a request to establish a a binary data translation environment to performing data decoding may be received, such as shown in 224 of FIG. 2. This request may identify a data source such as the data source 170 of FIG. 1, a data consumer or data destination such as the data consumer 180 of FIG. 1, a binary input schema for the data source and an output format for the data destination, such as created or modified in step 222 of FIG. 2 or as shown in the schemas 112 of FIG. 1. In some embodiments, the binary input schema and output format may be different.

Responsive to the request, as shown in 510 a data translator, such as the data translator 100 of FIG. 1, may establish connections to the identified data source and data consumer, such as is shown in 225 and 226 of FIG. 2. Additionally, the data translator may perform other initialization operations (not shown) as required, including selection of schemas and protocols, establishment of authentication credentials, session credentials, encryption keys, data source metadata and so on.

As shown in 520, a binary data record may be identified once received from the data source 170. In some embodiments, this received data may be encrypted and thus require decryption before the data is identified. Record identification may occur when data is received according to the binary input schema. If the data source is a data stream, data bytes may be read from the data source until a sufficient buffer is loaded for subsequent operations. For data packet protocols, zero or more messages may be contained in a packet and may be buffered where applicable. If a data record includes a compressed payload then decompression may also be performed for the payload. If the binary input schema specifies a validation step (e.g., CRC32, checksum, MAC, error detection code, error correcting code, etc.), then an appropriate validation or verification algorithm may be applied, in some embodiments.

Once the record has been identified and all fields pre-processed as necessary, as shown in 530 respective keys and values for various fields of the identified record may be determined according to the binary input schema. In addition to the various fields decoded from the data stream, the data record may include fields that are derived from context. Examples of such fields include timestamps, data source fields, and so forth.

Then, as shown in 540, the translator may iterate through the determined fields of the data record defined in the binary input schema and produce records with their associated key and type metadata. If fields are specified as input-only, they may be omitted from this step. An example would be a checksum field that depends on the details of the binary protocol, and has only transient utility. The remaining fields may then be encoded and output as a new record, such as JavaScript Object Notation (JSON) schema records, Yet Another Markup Language (YAML) schema records, Standard Generalized Markup Language (SGML) schema records, Extensible Markup Language (XML) schema records, Comma Separated Variable (CSV) entries or other convenient formats. If compression is specified in the output, it may be applied at this time.

If more records are expected or available to be translated, as indicated by a positive exit from 550, the process may then return to 520 to translate additional data records. If no more records are to be translated, as indicated by a negative exit in 550, the process may proceed to 560 where the connections to the data source and data destination may then be closed.

Figure 6:
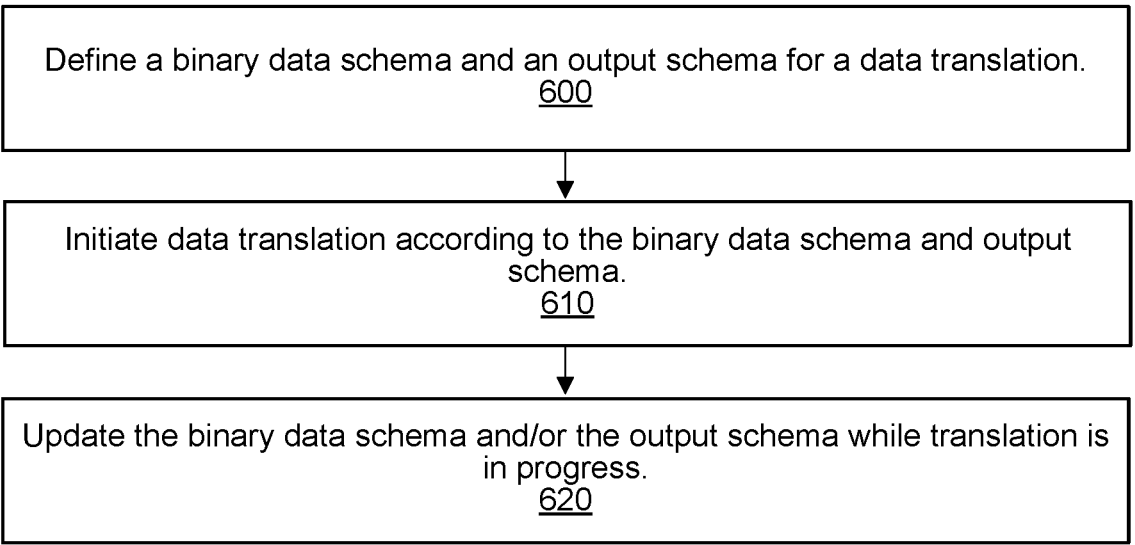
FIG. 6 is a flow diagram illustrating updating schema definitions for a system that implements dynamic binary message decoding, according to at least some embodiments.

FIG. 6 is a flow diagram illustrating updating schema definitions for a system that implements dynamic binary message decoding, according to at least some embodiments. As shown in 600, a binary input schema and an output schema may be first be defined, as previously discussed in FIG. 2. This defining may occur as a distinct step in some embodiments, or it may be performed as part of a request to establish translation, such as by combining step 222 with step 224 of FIG. 2.

Then, as shown in 610, data translation may be initiated according to the binary input schema and the output schema, such as shown in 224 of FIG. 2 or steps 500 and 510 of FIG. 5. Then, as shown in 620, another request may be received to redefine, replace or update one or both of the binary input schema and the output schema. This update request may be received after a portion of input records have already been translated, such as though a number of iterations of steps 520, 530 and 540 of FIG. 5. By supporting dynamically updating schemas, active translators may be updated to current schema specifications as the active translators that use those schemas remain available to process records.

Figure 7:
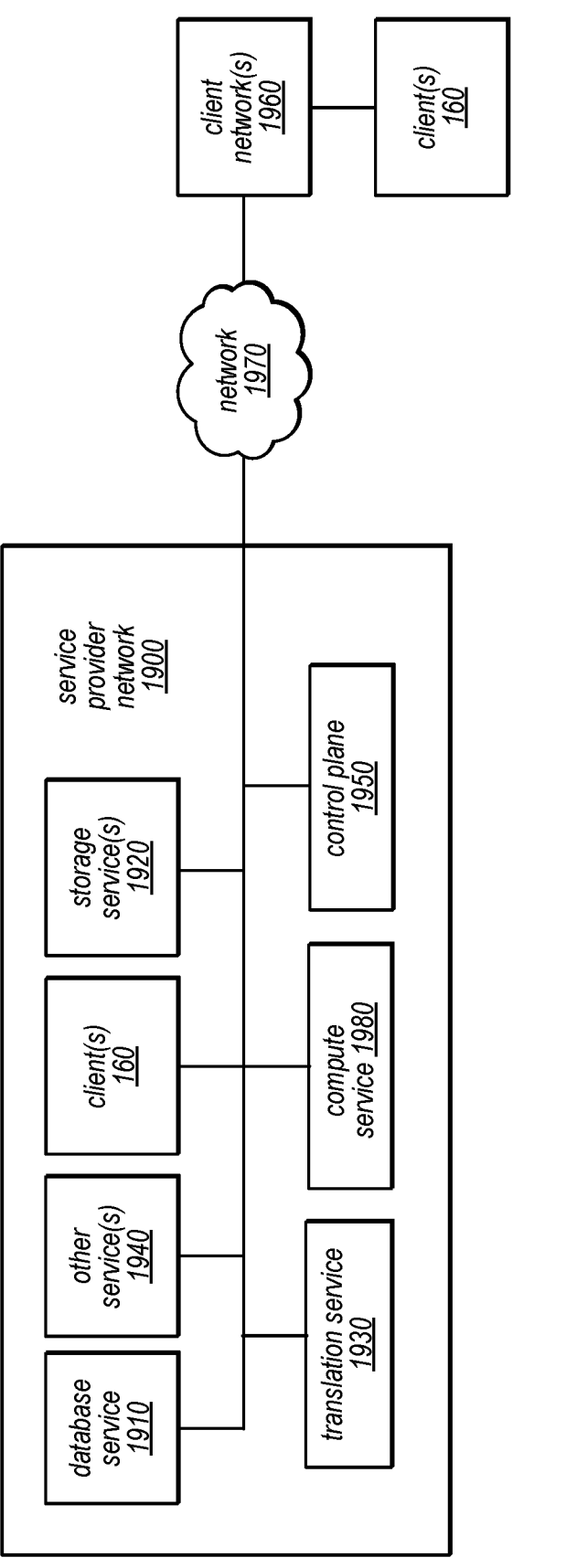
FIG. 7 is a block diagram illustrating a service-provider based architecture for a system that implements dynamic binary message decoding, according to at least some embodiments.

FIG. 7 is a block diagram illustrating a service-provider based architecture for a system that implements combined active and pre-initialized resource management for rapid auto-scaling, according to at least some embodiments.

Service provider network 1900 is illustrated as providing numerous services such as, but not limited to, a database service 1910 (providing relational, non-relational database services, or both), storage service(s) 1920 (e.g., key-value store, short-term, long-term, or the like, etc.), compute service 1980 (e.g., providing virtual computing capabilities), translation service 1930 (e.g. providing data translation capabilities described herein) and other services 1940 as well as and clients 160. Clients 160 are illustrated as both external (communicably coupled via client networks 1960 and intermediate network 1970 (e.g., the Internet or similar) to the service provider network) and internal to the service provider network. In some embodiments, one of the services of the service provider network may be a client of another one of the services.

Service provider network 1900 may be formed as a number of regions, where a region is a separate geographical area in which the service provider clusters data centers. Each region may include two or more availability zones connected to one another via a private high-speed network, for example a fiber communication connection. An availability zone (AZ), also known as an availability domain, or simply a "zone", refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1900 via a publicly accessible network (e.g., the Internet, a cellular communication network). Regions are connected to a global network which includes private networking infrastructure (e.g., fiber connections controlled by the cloud provider) connecting each region to at least one other region. The service provider network 1900 may deliver content from points of presence outside of, but networked with, these regions by way of edge locations and regional edge cache servers. An edge location may be an extension of the service provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1900 to provide low-latency resource access to customers on a global scale with a high degree of fault tolerance and stability.

The traffic and operations of the service provider network 1900 may be broadly be subdivided into two categories in various embodiments: control plane operations carried over a logical control plane 1950 and data plane operations carried over a logical data plane. While the data plane represents the movement of user data through the distributed computing system, the control plane 1950 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the service provider network 1900 (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1900 may include the hardware (e.g., modems, routers, switches, load balancers, proxy servers, etc.) and software (e.g., protocol stacks, accounting software, firewall/security software, etc.) necessary to establish a networking links between different components of service provider network 1900, such as computation and storage hosts, control plane components as well as external networks, such as network (e.g., the Internet). In some embodiments, service provider network 1900 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 160 may be attached to the overlay network so that when a client provides an IP address that they want to send packets to, the IP address is run in virtual space by communicating with a mapping service that knows where the IP overlay addresses are.

Illustrative System

Figure 8:
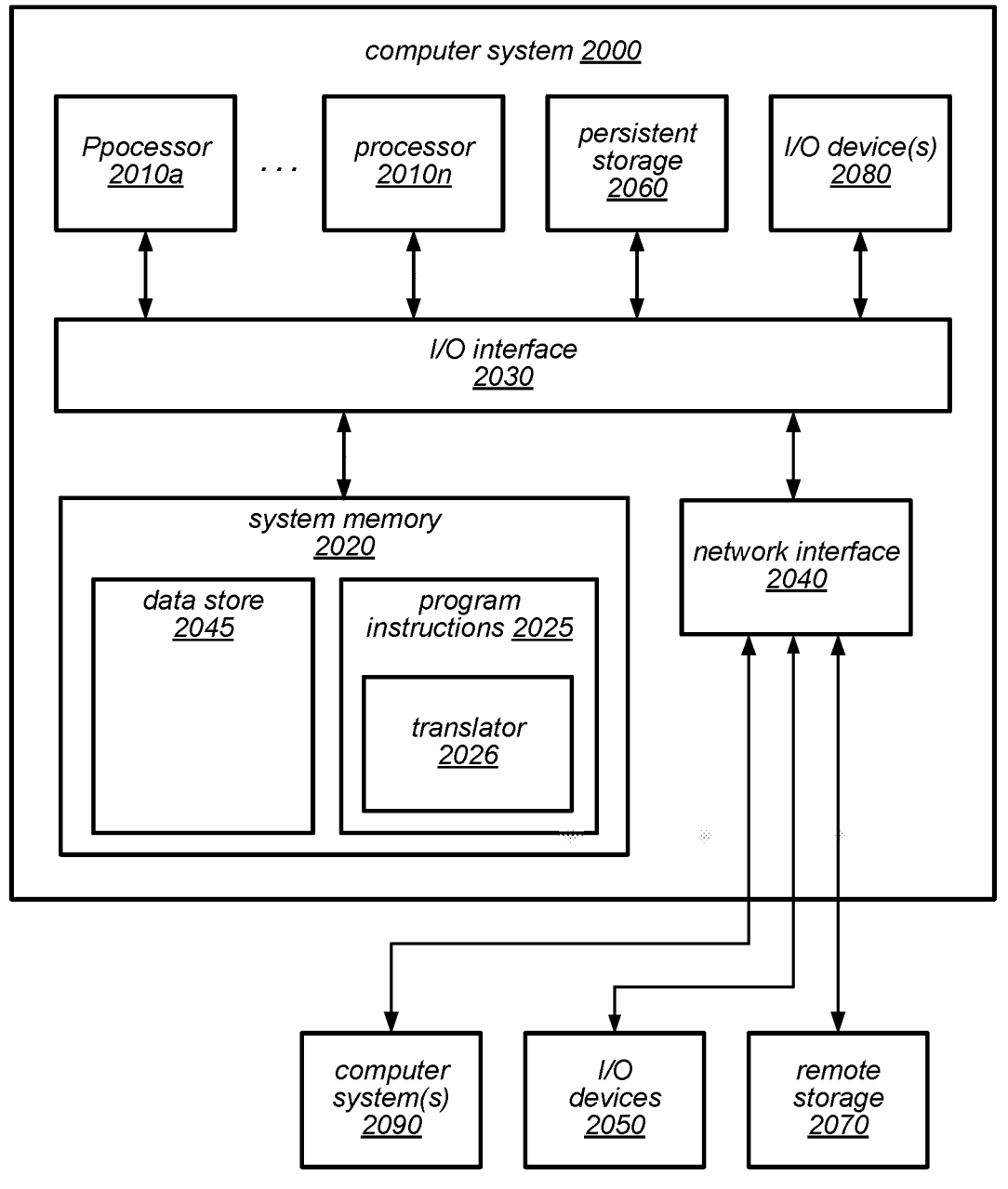
FIG. 8 is a block diagram illustrating an example computer system that may be used in some embodiments of a system that implements dynamic binary message decoding, according to at least some embodiments.

Any of various computer systems may be configured to implement processes associated with dynamic binary message decoding as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 8 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, ARM, RISC-V or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for translator as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard, Peripheral Component Interconnect Express (PCIe) interconnect standard or the Universal Serial Bus (USB) standard, or through various types of serial interconnect standards such as RS-232, RS-488 ARING 818 and so forth. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi, 4G LTE, 5G, LORAWAN, Bluetooth, Zigbee or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a database migration service and deployment as described herein may be executed on one or more computer systems, which may interact with various other devices. FIG. 8 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX™, Linux™, MacOS™, Windows™, FreeRTOST etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as JavaScript Object Notation (JSON) or Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a binary translator for a stream processing service of a provider network, the binary translator configured to:
receive, via a first programmatic interface, a request to decode a binary data stream, wherein the request identifies a binary schema and an output format, wherein the binary data stream comprises data for one or more events of a second programmatic interface, and responsive to receiving the request:
establish a streaming connection to the second programmatic interface of a data source;
identify an input record, corresponding to an event of the one or more events of the second programmatic interface, within the binary data stream received from the data source on behalf of a client according to the binary schema identified in the request;
determine respective keys and respective values for one or more fields of the input record according to the binary schema identified in the request; and
output, as key-value pairs, at least a portion of the determined values as an output record using the output format different than the binary schema.

2. The system of claim 1, wherein the binary schema comprises an error detection code field, and wherein the translator is further configured to verify the record prior to outputting at least of portion of the determined values.

3. The system of claim 1, wherein the output format is one or more of a JavaScript Object Notation (JSON) schema, a Yet Another Markup Language (YAML) schema, a Standard Generalized Markup Language (SGML) schema and an Extensible Markup Language (XML) schema, and wherein the output format identified in the request.

4. The system of claim 1, wherein at least one of the input record and output record comprise either encrypted or compressed data.

5. A method, comprising:
performing by one or more computing devices implementing a translation engine:
receiving, via a first programmatic interface, a request to decode a data stream, wherein the request identifies a binary schema and an output format, wherein the data stream comprises data for one or more events of a second programmatic interface, and responsive to receiving the request:
establishing a streaming connection to the second programmatic interface of a data source;
identifying a record, corresponding to an event of the one or more events of the second programmatic interface, within the data stream received from the data source on behalf of a client according to the schema identified in the request;
determining respective values for one or more fields of the record according to the schema identified in the request; and outputting at least a portion of the determined values of the record using the output format different than the schema.

6. The method of claim 5, wherein the method further comprises verifying the respective values for one or more fields of the record prior to outputting at least of portion of the determined values.

7. The method of claim 6, wherein the schema comprises a verification field, and wherein the method further comprises verifying the record prior to outputting at least of portion of the determined values.

8. The method of claim 5, wherein the output format is one or more of a JavaScript Object Notation (JSON) schema, a Yet Another Markup Language (YAML) schema, a Standard Generalized Markup Language (SGML) schema and an Extensible Markup Language (XML) schema, and wherein the output format identified in the request.

9. The method of claim 5, further comprising:
receiving, via the programmatic interface or another programmatic interface, a request to update the schema, and responsive to receiving the request:
performing the identifying, determining and outputting for at least another record of the one or more records within the data stream.

10. The method of claim 5, wherein outputting a value of the at least of portion of the determined values comprises:
determining a key associated with the value according to the schema; and
outputting the values as a key-value pair.

11. The method of claim 5, wherein the data stream is an internal message stream of an application of the client.

12. The method of claim 5, wherein the data stream is a human-readable data stream.

13. The method of claim 5, wherein the translation engine is implemented as part of a stream processing service of a provider network.

14. One or more non-transitory computer-accessible storage media storing program instructions that when executed on or across one or more computing devices cause the one or more computing devices to implement a decoder to perform:
receiving, via an application programming interface (API), a request to decode a binary data stream, wherein the request identifies a binary protocol and an output format, wherein the binary data stream comprises data for one or more events of a programmatic interface, and responsive to receiving the request:
establishing a streaming connection to the programmatic interface of a data source;
identifying a record, corresponding to an event of the one or more events of the programmatic interface, within the binary data stream received from the data source on behalf of a client according to the binary protocol identified in the request;
determining respective values for one or more fields of the record according to the binary protocol identified in the request; and
outputting at least a portion of the determined values using the output format different than the binary protocol.

15. The one or more non-transitory computer-accessible storage media of claim 14, wherein the binary protocol comprises and validation field, and wherein the method further comprises verifying the record prior to outputting at least of portion of the determined values.

16. The one or more non-transitory computer-accessible storage media of claim 14, wherein the output format is one or more of a JavaScript Object Notation (JSON) schema, a Yet Another Markup Language (YAML) schema, a Standard Generalized Markup Language (SGML) schema and an Extensible Markup Language (XML) schema, and wherein the output format identified in the request.

17. The one or more non-transitory computer-accessible storage media of claim 16, wherein the output format is a Comma Separated Variable (CSV) format.

18. The one or more non-transitory computer-accessible storage media of claim 14, wherein outputting a value of the at least of portion of the determined values comprises:

determining a key associated with the value according to the binary schema/protocol; and outputting the values as a key-value pair.

19. The one or more non-transitory computer-accessible storage media of claim 14, wherein the internal message stream is a bidirectional message stream of an API provided by an application of the client.

20. The one or more non-transitory computer-accessible storage media of claim 14, wherein the output format is a binary format.

\* \* \* \* \*